US010888173B2

(12) United States Patent
Shakal (10) Patent No.: US 10,888,173 B2
(45) Date of Patent: Jan. 12, 2021

(54) AIR CONTROLLER WITH VIBRATION ISOLATORS (71) Applicant: Sleep Number Corporation, Minneapolis, MN (US)

(72) Inventor: Anthony John Shakal, Rogers, MN (US)

(73) Assignee: Sleep Number Corporation, Minneapolis, MN (US)

( * ) Notice: Subject to any disclaimer, the term of this patent is extended or adjusted under 35 U.S.C. 154(b) by 1012 days.

(21) Appl. No.: 15/337,484

(22) Filed: Oct. 28, 2016

(65) Prior Publication Data

US 2018/0116419 A1    May 3, 2018

(51) Int. Cl.
| A47C 27/08 | (2006.01) |
| A47C 27/10 | (2006.01) |
| F16F 15/08 | (2006.01) |
| F16F 1/376 | (2006.01) |
| F16F 1/373 | (2006.01) |

(52) U.S. Cl.
CPC .......... *A47C 27/083* (2013.01); *A47C 27/082* (2013.01); *A47C 27/10* (2013.01); *F16F 1/376* (2013.01); *F16F 15/08* (2013.01); *F16F 1/3732* (2013.01)

(58) Field of Classification Search
CPC ..... A47C 27/083; A47C 27/082; A47C 27/10; F16F 1/376; F16F 15/08; F16F 1/3732; F16F 7/10; F16F 15/00; F16F 15/04; F16F 15/1201; F16F 15/12333; F16F 9/364; F16F 7/087; F16F 7/1028; F16F 7/104; F16F 2238/04; F16F 2236/123; F16F 2236/126; F16F 2236/085; F16F 2230/007; F16F 15/021; F16F 15/067; B23Q 11/0032; G05D 19/00; F04B 39/0044
USPC .............................. 5/706; 248/582, 566, 624
See application file for complete search history.

(56) References Cited

U.S. PATENT DOCUMENTS

| 1,138,457 | A | * | 5/1915 | Dahlmeyer | ............ | B22D 18/04 164/147.1 |
| 1,377,556 | A | * | 5/1921 | Bridgman | ............. | F16F 15/067 248/624 |
| 1,502,866 | A | * | 7/1924 | Moore | ..................... | B60Q 1/26 248/624 |
| 1,766,597 | A | * | 6/1930 | Bushnell | ................. | B61L 99/00 248/566 |
| 1,805,785 | A | * | 5/1931 | Replogle | ............... | F16F 15/067 248/561 |
| 2,041,353 | A | * | 5/1936 | Kenney | ................. | F16F 1/3732 267/141.7 |

(Continued)

OTHER PUBLICATIONS

U.S. Appl. No. 14/885,751, filed Oct. 16, 2015, Palashewski et al.
U.S. Appl. No. 14/819,630, filed Aug. 6, 2015, Nunn et al.

*Primary Examiner* — Nicholas F Polito
*Assistant Examiner* — Luke Hall
(74) *Attorney, Agent, or Firm* — Fish & Richardson P.C.

(57) ABSTRACT

An air controller can include an air pump, a flow control assembly, and vibration isolators. The vibration isolators can be positioned between the flow control assembly and supporting structures, such as supporting structures of a housing, to dampen vibration of the flow control assembly. The air controller can inflate and deflate an inflatable air chamber of a mattress of an air bed.

19 Claims, 9 Drawing Sheets

(56) References Cited

U.S. PATENT DOCUMENTS

| | | | | |
|---|---|---|---|---|
| 2,173,342 A * | 9/1939 | Siegfried | F16F 15/067 | 248/624 |
| 2,339,549 A * | 1/1944 | Kubaugh | F16B 43/00 | 411/544 |
| 2,397,804 A * | 4/1946 | Nakken | F16F 3/10 | 248/574 |
| 2,481,505 A * | 9/1949 | Frazier | F16F 15/067 | 248/574 |
| 2,809,005 A * | 10/1957 | Goode | F16F 15/067 | 248/582 |
| 2,852,223 A * | 9/1958 | Roberts | F16F 15/067 | 248/566 |
| 3,323,764 A * | 6/1967 | Johnson | F16F 3/10 | 267/140.4 |
| 3,635,332 A * | 1/1972 | Ross | B65D 81/07 | 206/591 |
| 3,727,865 A | 4/1973 | Binge et al. | | |
| 3,784,994 A * | 1/1974 | Kery | A47C 23/002 | 5/710 |
| 3,825,374 A * | 7/1974 | Kondo | A01K 63/042 | 417/413.1 |
| 4,040,590 A * | 8/1977 | Baratoff | F16F 15/02 | 248/569 |
| 4,238,104 A * | 12/1980 | Hamilton | F16F 3/10 | 188/380 |
| 4,476,969 A * | 10/1984 | Dykema | F41A 25/10 | 188/380 |
| 4,522,378 A * | 6/1985 | Nelson | F16B 5/0258 | 16/2.1 |
| 4,766,628 A | 8/1988 | Greer et al. | | |
| 4,788,729 A | 12/1988 | Greer et al. | | |
| D300,194 S | 3/1989 | Walker | | |
| 4,829,616 A | 5/1989 | Walker | | |
| 4,890,344 A | 1/1990 | Walker | | |
| 4,897,890 A | 2/1990 | Walker | | |
| 4,898,360 A * | 2/1990 | VonHayn | B60T 8/3675 | 251/129.01 |
| 4,908,895 A | 3/1990 | Walker | | |
| D313,973 S | 1/1991 | Walker | | |
| 4,982,466 A * | 1/1991 | Higgins | A47C 27/082 | 5/713 |
| 4,988,069 A * | 1/1991 | D'Silva | F04B 43/082 | 248/605 |
| 4,989,823 A * | 2/1991 | Chapman | F16F 15/067 | 248/638 |
| 4,991,244 A | 2/1991 | Walker | | |
| 5,011,379 A * | 4/1991 | Hashimoto | F04B 43/04 | 417/360 |
| 5,016,409 A * | 5/1991 | Sato | E01D 19/00 | 52/167.2 |
| 5,052,904 A * | 10/1991 | Itakura | A01K 63/047 | 417/363 |
| 5,072,917 A * | 12/1991 | Pleva | F16C 25/083 | 267/161 |
| 5,123,625 A * | 6/1992 | Spaltofski | F16F 1/376 | 248/634 |
| 5,144,706 A | 9/1992 | Walker et al. | | |
| 5,170,522 A | 12/1992 | Walker | | |
| D368,475 S | 4/1996 | Scott | | |
| 5,509,154 A * | 4/1996 | Shafer | A47C 27/082 | 5/713 |
| 5,564,140 A | 10/1996 | Shoenhair et al. | | |
| 5,642,546 A | 6/1997 | Shoenhair | | |
| 5,652,484 A | 7/1997 | Shafer et al. | | |
| 5,691,037 A * | 11/1997 | McCutcheon | B32B 3/06 | 428/172 |
| 5,761,031 A * | 6/1998 | Ajmani | G11B 33/1493 | 361/679.34 |
| 5,765,246 A | 6/1998 | Shoenhair | | |
| D396,403 S * | 7/1998 | Whittaker | D8/354 | |
| 5,903,941 A | 5/1999 | Shafer et al. | | |
| 5,904,172 A * | 5/1999 | Gifft | A47C 27/082 | 137/224 |
| 6,037,723 A | 3/2000 | Shafer et al. | | |
| 6,108,844 A | 8/2000 | Kraft et al. | | |
| 6,132,183 A * | 10/2000 | Li | F04B 39/0033 | 248/638 |
| 6,161,231 A | 12/2000 | Kraft et al. | | |
| 6,202,239 B1 | 3/2001 | Ward et al. | | |
| 6,247,686 B1 * | 6/2001 | Gabbin | F16F 1/3732 | 267/147 |
| 6,302,145 B1 * | 10/2001 | Ellis | A47C 27/082 | 137/223 |
| 6,371,434 B1 * | 4/2002 | Becker | F16F 15/04 | 248/610 |
| 6,390,445 B2 * | 5/2002 | Fukano | G05D 16/2024 | 251/129.19 |
| 6,397,419 B1 | 6/2002 | Mechache | | |
| 6,483,264 B1 | 11/2002 | Shafer et al. | | |
| 6,686,711 B2 | 2/2004 | Rose et al. | | |
| 6,708,357 B2 | 3/2004 | Gaboury et al. | | |
| 6,763,541 B2 | 7/2004 | Mahoney et al. | | |
| 6,804,848 B1 | 10/2004 | Rose | | |
| 6,832,397 B2 | 12/2004 | Gaboury | | |
| D502,929 S | 3/2005 | Copeland et al. | | |
| 6,883,191 B2 | 5/2005 | Gaboury et al. | | |
| 6,917,520 B2 * | 7/2005 | Lin | G06F 1/184 | 248/917 |
| 7,322,801 B2 | 1/2008 | Li et al. | | |
| 7,331,054 B2 * | 2/2008 | Song | G11B 33/08 | 720/692 |
| 7,389,554 B1 | 6/2008 | Rose | | |
| 7,394,009 B2 * | 7/2008 | Judd | G10D 13/06 | 248/634 |
| 7,444,704 B2 * | 11/2008 | Phillips | G16H 40/63 | 5/713 |
| 7,614,855 B2 * | 11/2009 | Cook | F04B 17/03 | 264/674 |
| 7,865,988 B2 | 1/2011 | Koughan et al. | | |
| 7,926,780 B2 * | 4/2011 | Yeh | F16F 15/08 | 248/632 |
| 8,201,292 B2 * | 6/2012 | Dionne | A61G 7/001 | 5/706 |
| 8,282,452 B2 | 10/2012 | Grigsby et al. | | |
| 8,336,369 B2 * | 12/2012 | Mahoney | G01M 3/3263 | 73/40 |
| 8,444,558 B2 | 5/2013 | Young et al. | | |
| 8,480,052 B2 * | 7/2013 | Taylor | F16F 15/067 | 248/563 |
| D691,118 S | 10/2013 | Ingham et al. | | |
| D697,874 S | 1/2014 | Stusynski et al. | | |
| D698,338 S | 1/2014 | Ingham | | |
| 8,641,391 B2 * | 2/2014 | Pan | F04D 25/0673 | 417/305 |
| D701,536 S | 3/2014 | Sakal | | |
| 8,672,853 B2 | 3/2014 | Young | | |
| 8,727,753 B2 * | 5/2014 | Ishibashi | F04B 35/04 | 417/312 |
| 8,769,747 B2 | 7/2014 | Mahoney et al. | | |
| 8,931,329 B2 | 1/2015 | Mahoney et al. | | |
| 8,966,689 B2 | 3/2015 | McGuire et al. | | |
| 8,973,183 B1 | 3/2015 | Palashewski et al. | | |
| 8,984,687 B2 | 3/2015 | Stusynski et al. | | |
| D737,250 S | 8/2015 | Ingham et al. | | |
| 9,151,285 B2 * | 10/2015 | Wu | F04B 53/164 | |
| 9,360,900 B1 * | 6/2016 | Szeremeta | G06F 1/187 | |
| 9,677,557 B2 * | 6/2017 | Hsu | F04B 53/001 | |
| 10,441,087 B2 * | 10/2019 | Karschnik | A47C 27/082 | |
| 2004/0130082 A1 * | 7/2004 | Tsai | F16F 1/376 | 267/153 |
| 2005/0158193 A1 * | 7/2005 | Roke | F04B 35/045 | 417/417 |
| 2005/0206058 A1 * | 9/2005 | Masterson | F16F 1/3732 | 267/293 |
| 2005/0214098 A1 * | 9/2005 | Franke | F16F 1/3732 | 411/401 |
| 2005/0284868 A1 * | 12/2005 | Ko | B60K 11/04 | 220/201 |

(56) References Cited

U.S. PATENT DOCUMENTS

| | | | |
|---|---|---|---|
| 2008/0077020 A1 | 3/2008 | Young et al. | |
| 2008/0128966 A1* | 6/2008 | Tsai | F16F 1/3732 267/140.3 |
| 2008/0181795 A1* | 7/2008 | Feingold | A47C 27/082 417/282 |
| 2011/0020149 A1* | 1/2011 | Tsai | A47C 27/082 417/321 |
| 2011/0061169 A1* | 3/2011 | Liu | A47C 27/082 5/710 |
| 2011/0144455 A1 | 6/2011 | Young et al. | |
| 2013/0230410 A1* | 9/2013 | Tsai | F04D 15/0016 417/32 |
| 2014/0182061 A1 | 7/2014 | Zaiss | |
| 2014/0239145 A1* | 8/2014 | Miyakoshi | F16F 1/3732 248/562 |
| 2014/0250597 A1 | 9/2014 | Chen et al. | |
| 2014/0257571 A1 | 9/2014 | Chen et al. | |
| 2014/0259417 A1 | 9/2014 | Nunn et al. | |
| 2014/0259418 A1 | 9/2014 | Nunn et al. | |
| 2014/0259431 A1 | 9/2014 | Fleury | |
| 2014/0259433 A1 | 9/2014 | Nunn et al. | |
| 2014/0259434 A1 | 9/2014 | Nunn et al. | |
| 2014/0277611 A1 | 9/2014 | Nunn et al. | |
| 2014/0277778 A1 | 9/2014 | Nunn et al. | |
| 2014/0277822 A1 | 9/2014 | Nunn et al. | |
| 2014/0339977 A1* | 11/2014 | Kannler | G06F 1/183 312/351.2 |
| 2015/0007393 A1 | 1/2015 | Palashewski | |
| 2015/0025327 A1 | 1/2015 | Young et al. | |
| 2015/0026896 A1 | 1/2015 | Fleury et al. | |
| 2015/0083456 A1* | 3/2015 | Chen | F16F 1/376 174/73.1 |
| 2015/0157137 A1 | 6/2015 | Nunn et al. | |
| 2015/0157519 A1 | 6/2015 | Stusynski et al. | |
| 2015/0182033 A1 | 7/2015 | Brosnan et al. | |
| 2015/0182397 A1 | 7/2015 | Palashewski et al. | |
| 2015/0182399 A1 | 7/2015 | Palashewski et al. | |
| 2015/0182418 A1 | 7/2015 | Zaiss | |
| 2015/0240906 A1* | 8/2015 | Wang | F16F 15/08 248/615 |
| 2015/0290059 A1 | 10/2015 | Brosnan et al. | |
| 2015/0366366 A1 | 12/2015 | Zaiss et al. | |
| 2015/0374137 A1 | 12/2015 | Mahoney et al. | |
| 2016/0100696 A1 | 4/2016 | Palashewski et al. | |
| 2016/0160880 A1* | 6/2016 | Douglas | F04B 49/106 137/14 |
| 2017/0254582 A1* | 9/2017 | Lesko | F16F 1/3732 |
| 2018/0001726 A1* | 1/2018 | Azpiazu Echave | B60G 13/001 |
| 2018/0114548 A1* | 4/2018 | Yonemaru | G11B 33/124 |
| 2018/0116418 A1* | 5/2018 | Shakal | F16K 31/0655 |
| 2018/0116420 A1* | 5/2018 | Shakal | A47C 27/082 |
| 2018/0119686 A1* | 5/2018 | Shakal | F04B 39/0044 |

* cited by examiner

AIR CONTROLLER WITH VIBRATION ISOLATORS

TECHNICAL FIELD

This invention relates to vibration, and more particularly to vibration isolators for use in air controllers of air beds.

BACKGROUND

People have traditionally used beds that come in many shapes, sizes, and styles. Such beds can range from extremely simple designs to rather complex designs that include a variety of features. For example, some beds can have one or more inflatable air chambers. Some of such beds can include an inflation system including a number of mechanical and electrical components. For example, some beds can include one or more pumps with one or more valves for inflating the air chambers.

SUMMARY

Some embodiments of an air controller pump system can include one or more of the features and functions disclosed herein. Some embodiments can include vibration isolators for dampening vibration of a flow control assembly to achieve quieter operation. The vibration isolators can have certain features allowing for ease of assembly and suitable dampening of vibration due to actuation of solenoid valves. This can be desirable, for example, in an air bed system configured for automatically adjusting pressure while a user is asleep, where quiet operation can be particularly desirable.

In one aspect, an air bed system can include a mattress comprising a first inflatable air chamber and an air controller fluidly connected to the first inflatable air chamber of the mattress for inflating and deflating the first inflatable air chamber. The air controller can include an air pump, a flow control assembly fluidly connected between the air pump and the first inflatable air chamber, and first and second supporting structures. The flow control assembly is supported between the first and second supporting structure. A plurality of vibration isolators can include at least a first vibration isolator positioned between the first supporting structure and the flow control assembly and a second vibration isolator positioned between the second supporting structure and the flow control assembly.

Some of the implementations described herein may optionally include one or more of the following features. The air controller includes a housing having a housing top and a housing bottom, wherein the first supporting structure is part of the housing top and the second supporting structure is part of the housing bottom, and wherein the vibration isolators prevent contact between the flow control assembly and the housing top and bottom so as to reduce transmission of vibration from the flow control assembly to the housing. The flow control assembly comprises an air manifold and a plurality of valves connected to the air manifold. The air manifold includes a first vertical post having a first post top and a first post bottom and a second vertical post having a second post top and a second post bottom, wherein the first vibration isolator is positioned between the first post top and the first supporting structure, wherein the second vibration isolator is positioned between the first post bottom and the second supporting structure, wherein a third vibration isolator is positioned between the second post top and the first supporting structure, and wherein a fourth vibration isolator is positioned between the second post bottom and the second supporting structure. The plurality of valves are rigidly mounted to the air manifold along a length of the air manifold between the first vertical post and the second vertical post. The valves comprise solenoid valves rigidly mounted to the air manifold and the air pump comprises a positive displacement pump spaced from the air manifold and connected to the air manifold via a tube. The air controller includes a housing having a housing top and a housing bottom. The first supporting structure is part of the housing top and the second supporting structure is part of the housing bottom. A threaded fastener extends through holes defined by the housing bottom, the first vibration isolator, the flow control assembly, the second vibration isolator, and the housing top to connect the housing top to the housing bottom and to hold the flow control assembly in place within the housing. The vibration isolators each comprise a cylindrical portion extending substantially circumferentially about an axis and an annular portion extending substantially radially with respect to the axis and having an inner rim that defines a hole and an outer rim connected to an end of the cylindrical portion. The annular portion includes a first set of projections extending from a first side of the annular portion and a second set of projections extending from a second side of the annular portion, wherein the second side is positioned opposite the first side. The first set of projections each extend radially from the inner rim to the outer rim and the second set of projections are shaped differently than the first set of projections. The second set of projections are positioned proximate to and spaced from an inner surface of the cylindrical portion. The flow control assembly includes a first vertical post having a first post top and a first post bottom. The first vibration isolator is positioned between the first post top and the first supporting structure with the cylindrical portion wrapped around a circumferential portion of the first post top with the second set of projections abutting an end of the first post top, the first set of projections abutting the first supporting structure, and the inner rim abutting the first supporting structure. The second vibration isolator is positioned between the first post bottom and the second supporting structure with the cylindrical portion of the second vibration isolator wrapped around a circumferential portion of the first post bottom, with the second set of projections of the second supporting structure abutting an end of the first post bottom, the first set of projections of the second vibration isolator abutting a printed circuit board, and the inner rim of the second vibration isolator abutting the second supporting structure. The flow control assembly includes a post having a post end, wherein the first vibration isolator is positioned between the post end and the first supporting structure with the cylindrical portion wrapped around a circumferential portion of the post, with the second set of projections abutting the post end, with the first set of projections abutting the first supporting structure, and with the inner rim abutting the first supporting structure. The flow control assembly includes a post having a post end, wherein the first vibration isolator is positioned between the post end and the first supporting structure with the cylindrical portion wrapped around a circumferential portion of the post, with the annular portion abutting the post end and the first supporting structure. The vibrations isolators comprise an elastomer.

In another aspect, an air controller includes an air pump, a flow control assembly having an air manifold fluidly connected to the air pump and a plurality of valves mounted to the air manifold, and a housing including a housing top having a first supporting structure and a housing bottom having a second supporting structure. The flow control assembly is supported between the first and second supporting structures. A plurality of vibration isolators include at least a first vibration isolator positioned between the first supporting structure and the flow control assembly and a second vibration isolator positioned between the second supporting structure and the flow control assembly.

Some of the implementations described herein may optionally include one or more of the following features. The vibration isolators each comprise a cylindrical portion extending substantially circumferentially about an axis and an annular portion extending substantially radially with respect to the axis. The annular portion has an inner rim that defines a hole and an outer rim connected to an end of the cylindrical portion. The annular portion includes a first set of projections extending from a first side of the annular portion and a second set of projections extending from a second side of the annular portion. The second side is positioned opposite the first side.

In another aspect, an air controller includes an air pump, a flow control assembly having an air manifold fluidly connected to the air pump and a plurality of valves mounted to the air manifold, a housing, and means for mounting the flow control assembly in the housing and dampening transmission of vibration from the flow control assembly to the housing.

The details of one or more embodiments of the invention are set forth in the accompanying drawings and the description below. Other features, objects, and advantages of the invention will be apparent from the description and drawings, and from the claims.

DETAILED DESCRIPTION

An air controller, such as for inflatable air beds, can both inflate and deflate air chambers of a mattress. In applications in which the air bed is configured for inflation and/or deflation while a user is sleeping on the air bed, quiet operation can be particularly desirable. An air control system can include vibration isolators connected to a flow control assembly having one or more valves to dampen vibration of the flow control assembly. This can reduce transmission of vibration from the valves to a housing of the air control system, and consequently, allow the air control system to operate more quietly.

Figure 1:
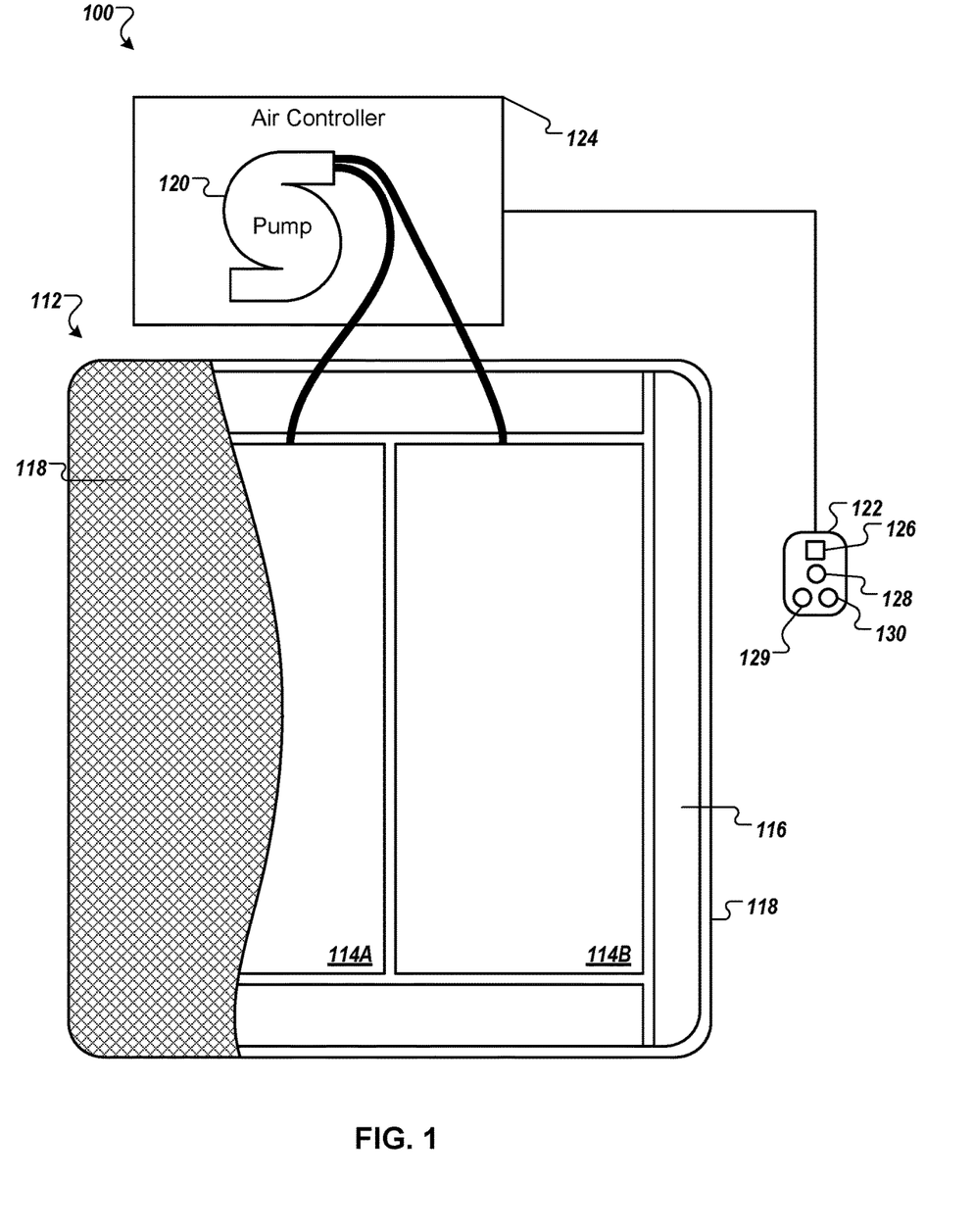
FIG. 1 shows an example air bed system.

FIG. 1 shows an example air bed system 100 that includes a bed 112. The bed 112 includes at least one air chamber 114 (e.g., a first air chamber 114A and a second air chamber 114B) surrounded by a resilient border 116 and encapsulated by bed ticking 118. The resilient border 116 can comprise any suitable material, such as foam.

As illustrated in FIG. 1, the bed 112 can be a two chamber design having first and second fluid chambers, such as the first air chamber 114A and the second air chamber 114B. In alternative embodiments, the bed 112 can include chambers for use with fluids other than air that are suitable for the application. In some embodiments, such as single beds or kids' beds, the bed 112 can include a single air chamber 114 or multiple air chambers 114. The first and second air chambers 114A and 114B can be in fluid communication with a pump 120. The pump 120 can be part of an air controller 124, which can be in electrical communication with a remote control 122. The air controller 124 can include a wired or wireless communications interface for communicating with one or more devices, including the remote control 122. The air controller 124 can be configured to operate the pump 120 to cause increases and decreases in the fluid pressure of the first and second air chambers 114A and 114B based upon commands input by a user using the remote control 122. In some implementations, the pump 120 and the air controller 124 can be integrated into a common housing. In other embodiments, the air controller 124 and the pump 120 can be in separate housings.

The remote control 122 can include a display 126, an output selecting mechanism 128, a pressure increase button 129, and a pressure decrease button 130. The output selecting mechanism 128 can allow the user to switch air flow generated by the pump 120 between the first and second air chambers 114A and 114B, thus enabling control of multiple air chambers with a single remote control 122 and a single pump 120. For example, the output selecting mechanism 128 can by a physical control (e.g., switch or button) or an input control displayed on display 126. Alternatively, separate remote control units can be provided for each air chamber and can each include the ability to control multiple air chambers. Pressure increase and decrease buttons 129 and 130 can allow a user to increase or decrease the pressure, respectively, in the air chamber selected with the output selecting mechanism 128. Adjusting the pressure within the selected air chamber can cause a corresponding adjustment to the firmness of the respective air chamber. In some embodiments, the remote control 122 can be omitted or modified as appropriate for an application. For example, in some embodiments the bed 112 can be controlled by a computer, tablet, smart phone, or other device in wired or wireless communication with the bed 112.

Figure 2:
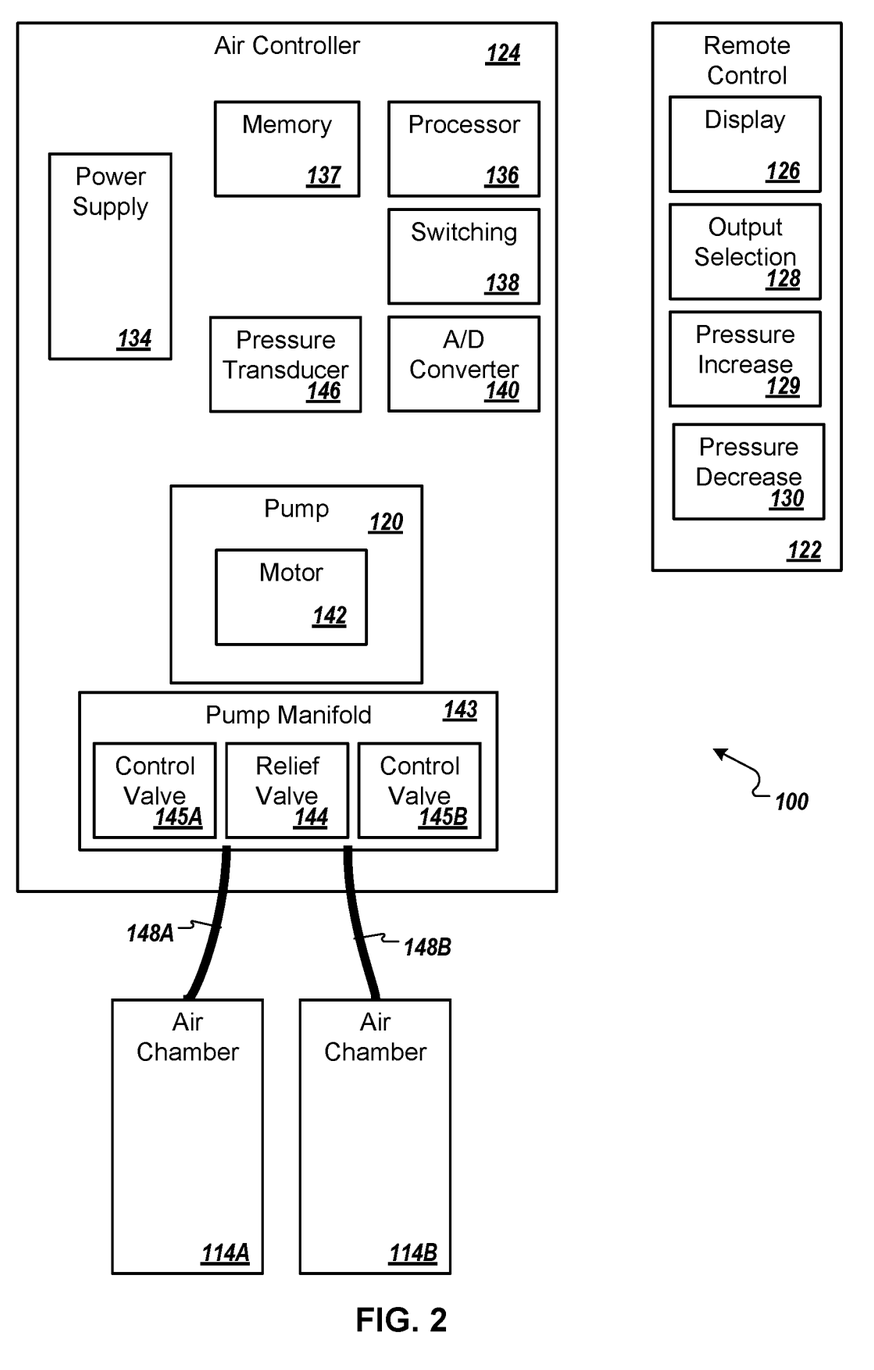
FIG. 2 is a block diagram of an example of various components of an air bed system.

FIG. 2 is a block diagram of an example of various components of an air bed system. For example, these components can be used in the example air bed system 100. As shown in FIG. 2, the air controller 124 can include the pump 120, a power supply 134, a processor 136, a memory 137, a switching mechanism 138, and an analog to digital (A/D) converter 140, an air manifold 143 (having valves (e.g., a relief valve 144, a first control valve 145A, and a second control valve 145B)), and one or more pressure transducers 146. The switching mechanism 138 can be, for example, a relay or a solid state switch.

The pump 120 can include a motor 142. The pump 120 can be fluidly connected to the pump manifold, which is fluidically connected with the first air chamber 114A and the second air chamber 114B via a first tube 148A and a second tube 148B, respectively. The first and second control valves 145A and 145B can be controlled by switching mechanism 138, and are operable to regulate the flow of fluid between the pump 120 and first and second air chambers 114A and 114B, respectively.

In some implementations, the pump 120 and the air controller 124 can be provided and packaged as a single unit. In some alternative implementations, the pump 120 and the air controller 124 can be provided as physically separate units. In some implementations, the air controller 124, the pump 120, or both are integrated within or otherwise contained within a bed frame or bed support structure that supports the bed 112. In some implementations, the air controller 124, the pump 120, or both are located outside of a bed frame or bed support structure (as shown in the example in FIG. 1).

In some embodiments, the pump 120 can be a positive displacement pump. In some of such embodiments, the pump 120 can reduce or prevent back flow. In other embodiments, the pump 120 can be of another type suitable for the application.

The example air bed system 100 depicted in FIG. 2 includes the two air chambers (i.e., the first and second air chambers 114A and 114B) and the single pump 120. However, other implementations can include an air bed system having two or more air chambers and one or more pumps incorporated into the air bed system to control the air chambers. For example, a separate pump can be associated with each air chamber of the air bed system or a pump can be associated with multiple chambers of the air bed system. Separate pumps can allow each air chamber to be inflated or deflated independently and simultaneously. Furthermore, additional pressure transducers can also be incorporated into the air bed system such that, for example, a separate pressure transducer can be associated with each air chamber.

In use, the processor 136 can, for example, send a decrease pressure command for one of the air chambers 114, and the switching mechanism 138 can be used to convert the low voltage command signals sent by the processor 136 to higher operating voltages sufficient to operate the relief valve 144 of the pump 120 and open the first control valve 145A or the second control valve 145B. Opening the relief valve 144 can allow air to escape from the air chamber 114 through the respective air tube 148A or 148B. During deflation, the pressure transducer 146 can send pressure readings to the processor 136 via the A/D converter 140. The A/D converter 140 can receive analog information from pressure transducer 146 and can convert the analog information to digital information useable by the processor 136. The processor 136 can send the digital signal to the remote control 122 to update the display 126 in order to convey the pressure information to the user. Alternatively, one or more of the air chambers 114 can be deflated without opening the relief valve 144 as further described below.

As another example, the processor 136 can send an increase pressure command. The pump motor 142 can be energized in response to the increase pressure command and send air to the designated one of the air chambers 114 through the air tube 148A or 148B via electronically operating the corresponding control valve 145A or 145B. While air is being delivered to the designated air chamber 114 in order to increase the firmness of the chamber, the pressure transducer 146 can sense pressure within the air manifold 143. Again, the pressure transducer 146 can send pressure readings to the processor 136 via the A/D converter 140. The processor 136 can use the information received from the A/D converter 140 to determine the difference between the actual pressure in the air chamber 114 and the desired pressure. The processor 136 can send the digital signal to the remote control 122 to update display 126 in order to convey the pressure information to the user.

Figure 3:
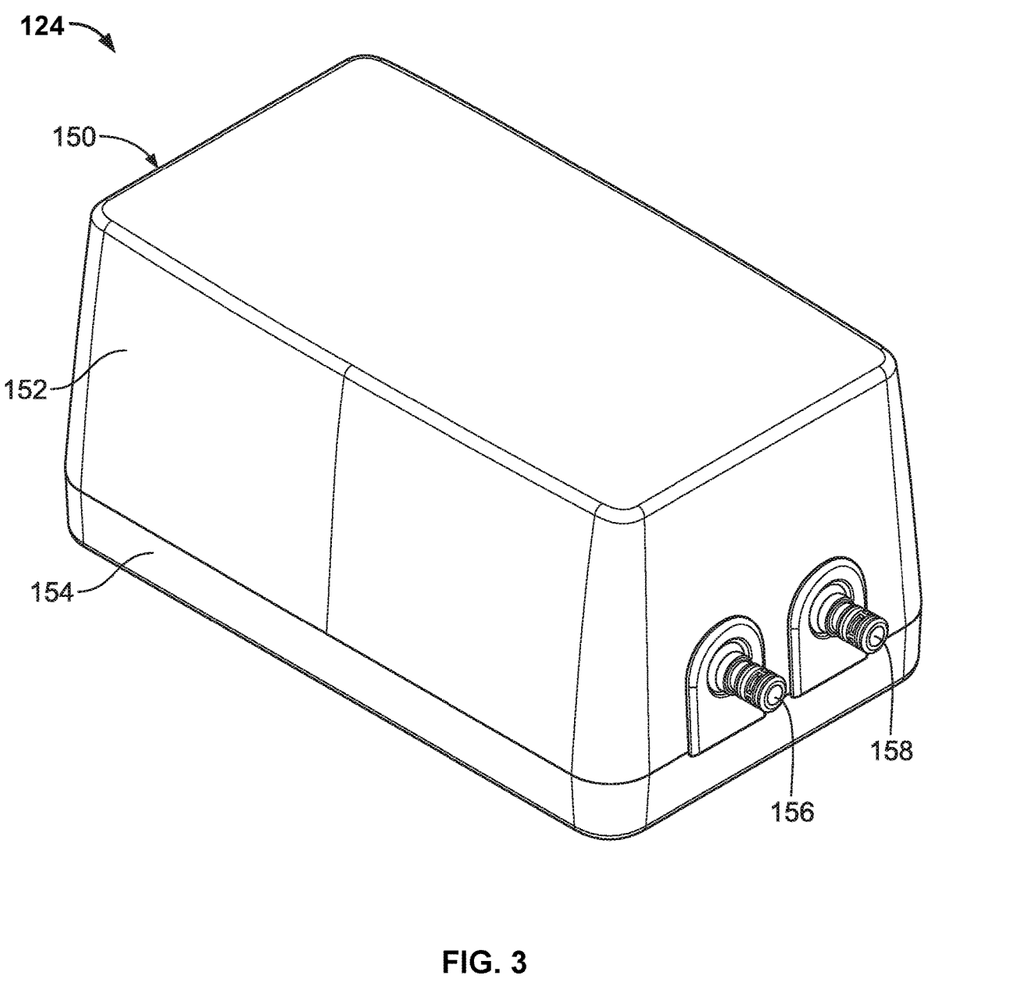
FIG. 3 is a perspective view of an air controller for use in an air bed system.

FIG. 3 is a perspective view of the air controller 124 in a housing 150. The housing 150 can include a housing top 152 and a housing bottom 154 and can substantially enclose components of the air controller 124. One or more outlets (e.g., a first outlet 156 and a second outlet 158) or nozzles can extend through the housing 150 and can be detachably connected to the air tubes 148A and 148B (shown in FIG. 2) for inflating the air chambers 114 (shown in FIG. 2).

Figure 4:
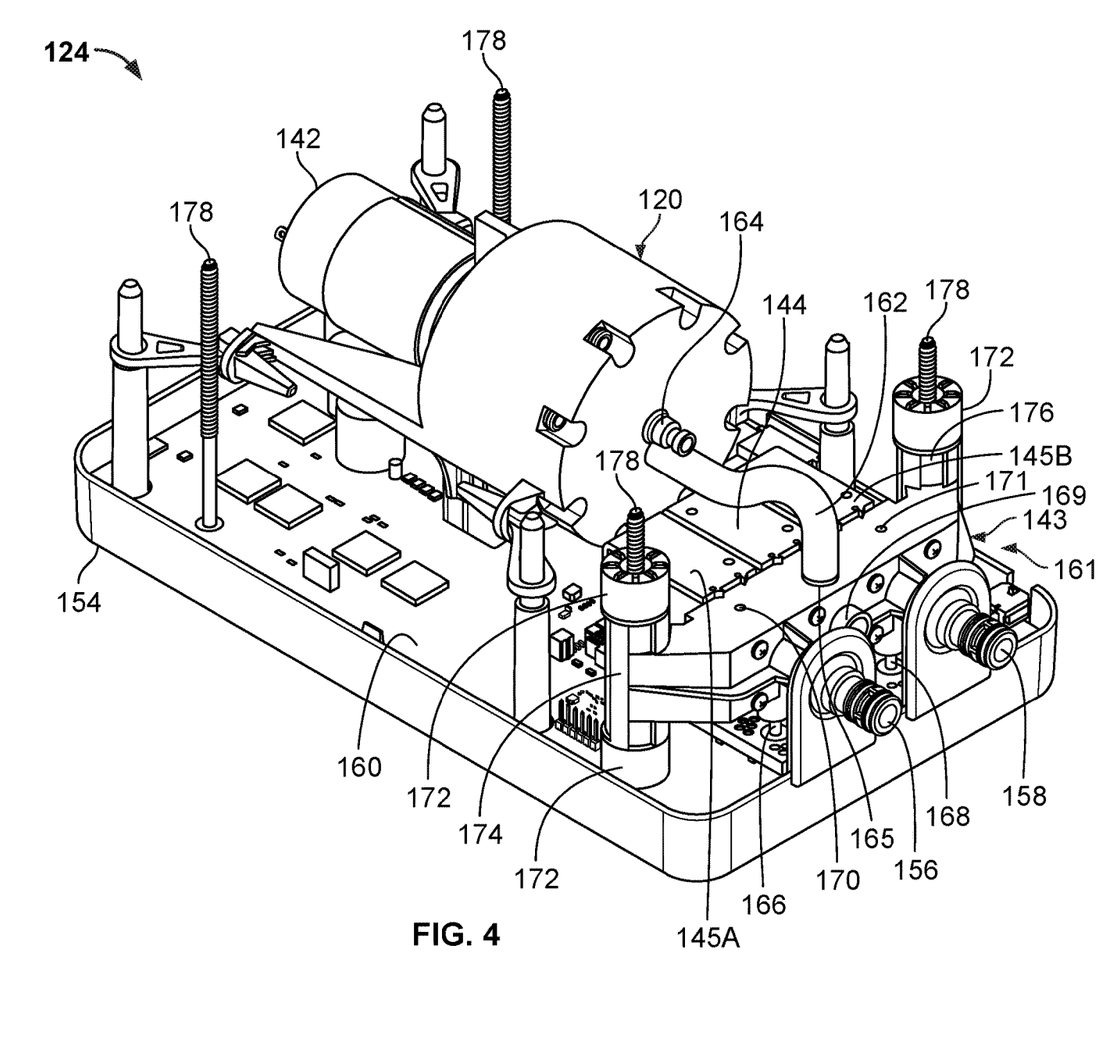
FIG. 4 is a perspective view of the air controller of FIG. 3 with a housing top removed.

FIG. 4 is a perspective view of the air controller 124 with the housing top 152 (shown in FIG. 3) removed so as to show internal components. As shown in FIG. 4, the housing 150 of the air controller 124 contains the pump 120 and its motor 142, the air manifold 143, valves (e.g., the relief valve 144, the first control valve 145A, and the second control valve 145B), and a printed circuit board 160 (which can include some or all of the power supply 134, the processor 136, the memory 137, the switching mechanism 138, the A/D converter 140, and the pressure transducer 146 shown in FIG. 2).

The air manifold 143 and the valves (e.g., the relief valve 144, the first control valve 145A, and the second control valve 145B) can combine to form a flow control assembly 161. The flow control assembly 161 can selectively control flow from the pump 120 to the air chambers 114. A tube 162 can extend from a outlet 164 of the pump 120 to an inlet 165 of the air manifold 143 for fluidly connecting the pump 120 to the air manifold 143. One or more additional tubes (e.g., a first tube 166 and a second tube 168) can extend from the air manifold 143 to one or more pressure transducers 146 (shown in FIG. 2) on the printed circuit board 160.

Figure 5:
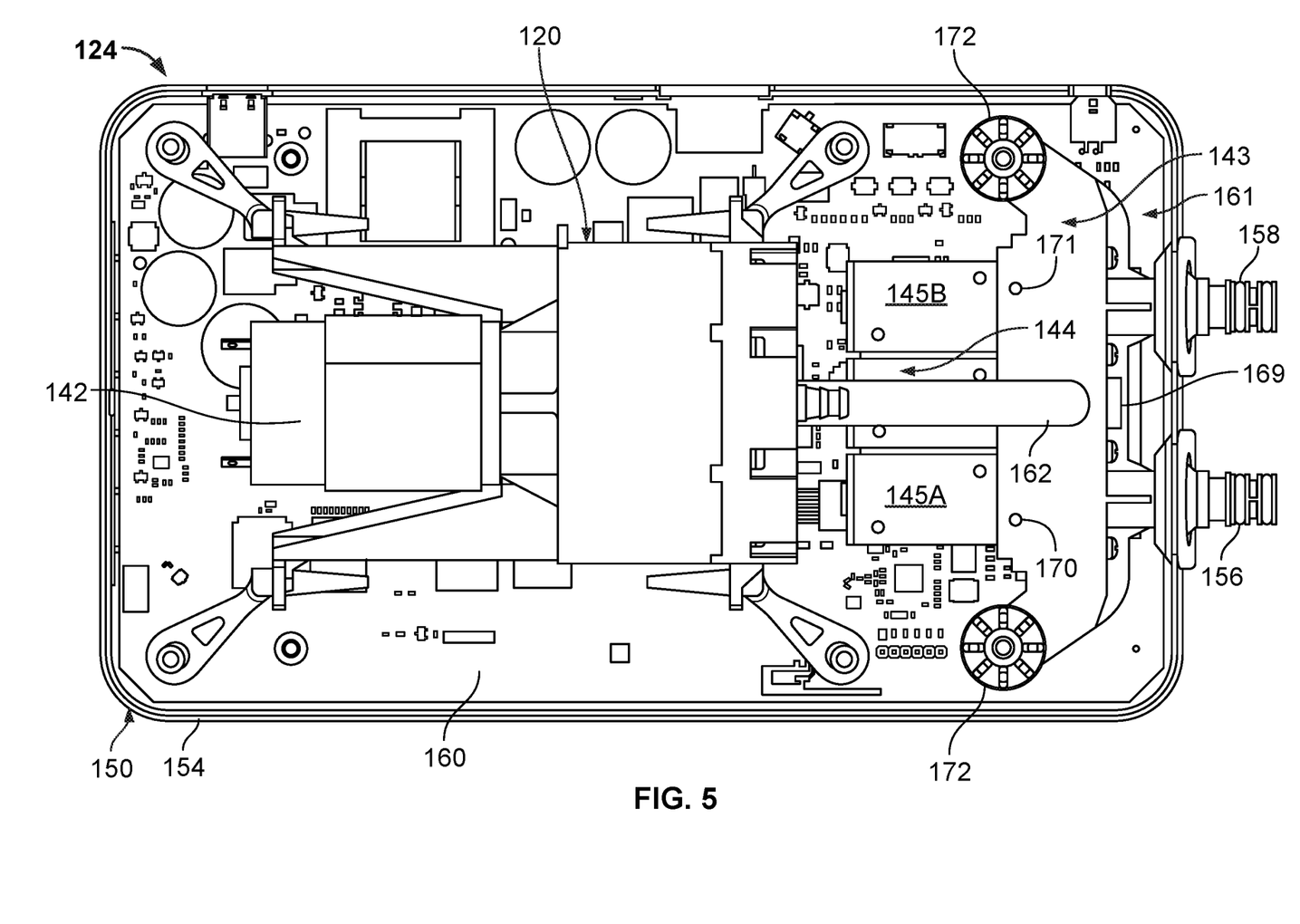
FIG. 5 is a top view of the air controller of FIG. 3 with the housing top removed.
Figure 6:
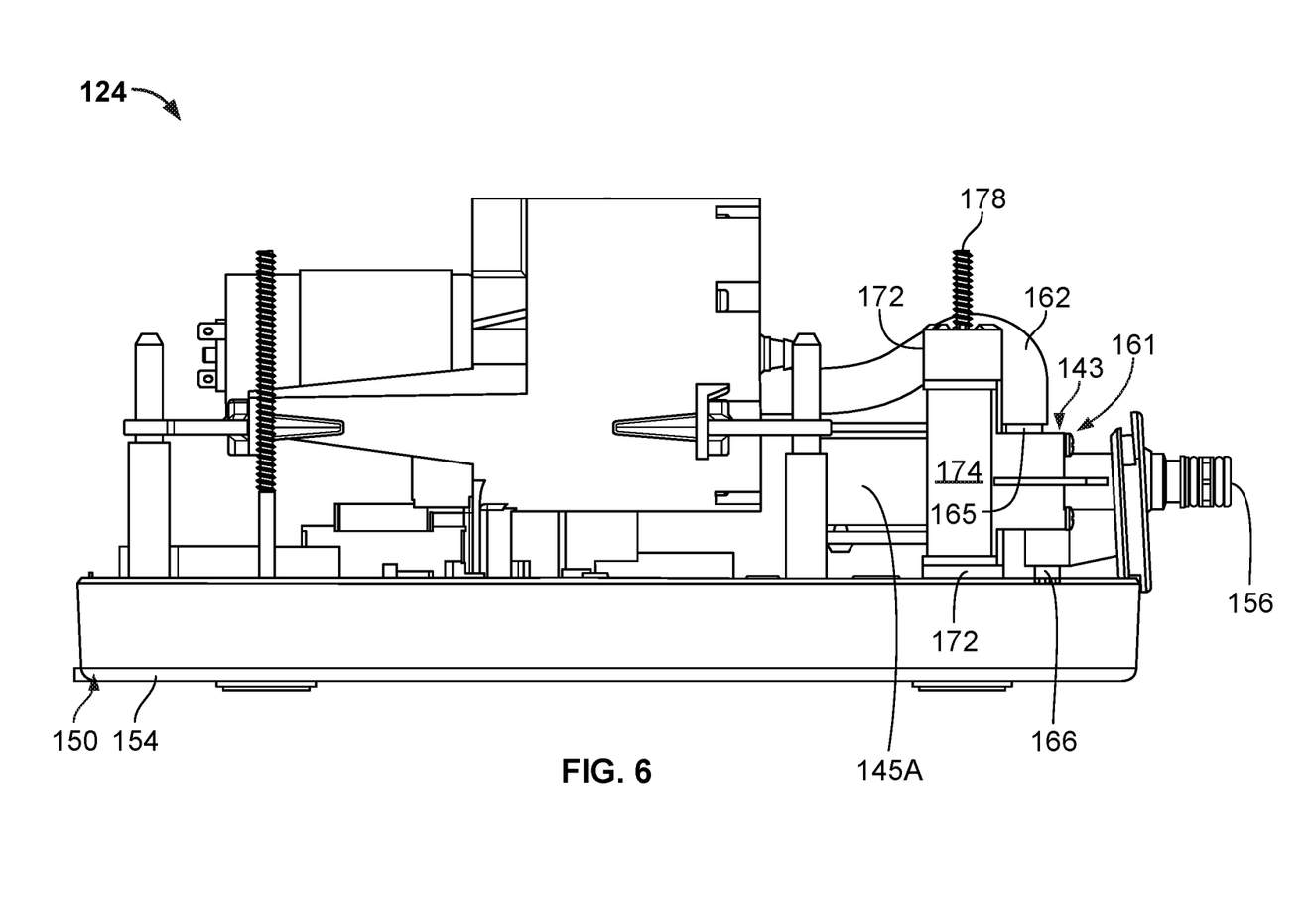
FIG. 6 is a side view of the air controller of FIG. 3 with the housing top removed.

FIG. 5 is a top view of the air controller 124 with the housing top 152 removed. FIG. 6 is a side view of the air controller 124 with the housing top 152 removed.

As shown in FIGS. 4-6, the air manifold 143 includes the valves (e.g., the relief valve 144, the first control valve 145A, and the second control valve 145B) attached thereto. The first control valve 145A can be controlled to selectively open and close to allow and restrict flow through the first outlet 156 to the first air chamber 114A (shown in FIGS. 1 and 2). The second control valve 145B can be controlled to selectively open and close to allow and restrict flow through the second outlet 158 to the air chamber 114B (shown in FIGS. 1 and 2). The relief valve 144 can be controlled to selectively open and close to allow and restrict flow through an exhaust port 169, allowing one of the air chambers 114 to be deflated when one of their respective first and second control valves 145A and 145B is open at the same time as the relief valve 144. Accordingly, the air manifold 143 can selectively allow air flow between the pump 120 (via the tube 162), the first air chamber 114A (via the first outlet 156), the second air chamber 114B (via the second outlet 158), and the atmosphere (via the exhaust port 169) depending on the open and closed status of the valves (e.g., the relief valve 144, the first control valve 145A, and the second control valve 145B).

The air manifold 143 can also include one or more vents (e.g., a first vent 170 and a second vent 171). The first and second vents 170 and 171 can connect a manifold interior to atmosphere. The first and second vents 170 and 171 can be non-valved and can remain open during substantially all operating conditions. This can allow for relatively slow deflation of one or more of the air chambers 114 by opening their corresponding control valve 145A or 145B, without necessitating opening of the relief valve 144.

Vibration isolators 172 can be used to dampen transmission of vibration from the flow control assembly 161 to the housing 150. For example, the valves (e.g., the relief valve 144, the first control valve 145A, and the second control valve 145B) can be rigidly mounted to the air manifold 143 along a length of the air manifold 143. When one or more of the valves (e.g., the relief valve 144, the first control valve 145A, and the second control valve 145B) opens or closes, such movement can cause the flow control assembly 161 to vibrate. Dampening vibration via the vibration isolators 172 at the flow control assembly 161 can allow for the air controller 124 to operate more quietly.

In some embodiments, the flow control assembly 161 can include first and second posts 174 and 176 configured for mounting the flow control assembly 161 within the housing 150. In the illustrated embodiment, the first and second posts 174 and 176 are substantially vertical posts of the air manifold 143. The first post 174 has a vibration isolator 172 on its top and another vibration isolator 172 on its bottom. The second post 176 also has a vibration isolator 172 on its top and another vibration isolator 172 (not shown) on its bottom. The flow control assembly 161 can be sandwiched between the housing top 152 (shown in FIGS. 3 and 7) and the housing bottom 154, with the vibration isolators 172 positioned between supporting structures, such as structures defined by the housing top 152 and the housing bottom 154.

The air controller 124 can included threaded fasteners 178 (such as screws or bolts) for connecting the housing top 152 to the housing bottom 154. One of the threaded fasteners 178 can extend through holes defined by the housing bottom 154, the second post 176 of the air manifold 143, vibration isolators 172 at the top and bottom of the second post 176, and the housing top 152. Another of the threaded fasteners 178 can extend through holes defined by the housing bottom 154, the post 178 of the air manifold 143, vibration isolators 172 at the top and bottom of the post 178, and the housing top 152. These threaded fasteners 178 can connect the housing top 152 to the housing bottom 154 in a manner that also holds the flow control assembly 161 in place within the housing 150.

Figure 7:
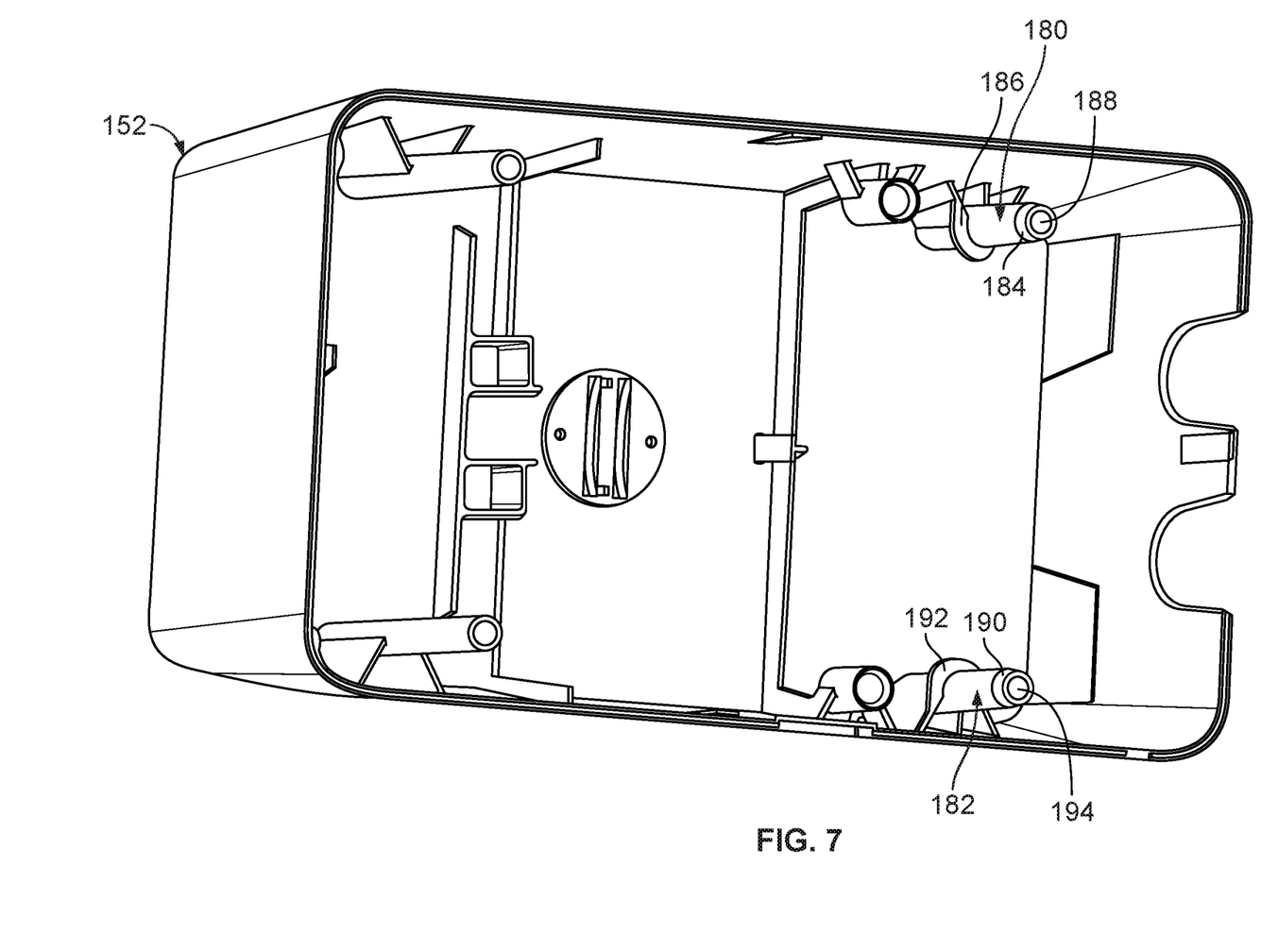
FIG. 7 is a perspective bottom view of a housing top.

FIG. 7 is perspective bottom view of the housing top 152. The housing top 152 can include first and second top supporting structures 180 and 182 for supporting the flow control assembly 161 (shown in FIGS. 4-6). The first top supporting structure 180 can include a first top projection 184 and a first top stop 186. The first top projection 184 can define a first top hole 188 for receiving and connecting to the threaded fastener 178 (shown in FIGS. 4-6). One of the vibration isolators 172 (shown in FIGS. 4-7 and 9A-9B) can abut the first top projection 184 and/or the first top stop 186 to dampen transmission of vibration between the flow control assembly 161 and the housing top 152.

Similarly, the second top supporting structure 182 can include a second top projection 190 and a second top stop 192. The second top projection 190 can define a second top hole 194 for receiving and connecting to the threaded fastener 178. One of the vibration isolators 172 can abut the second top projection 190 and/or the second top stop 192 to dampen transmission of vibration between the flow control assembly 161 and the housing top 152.

Figure 8:
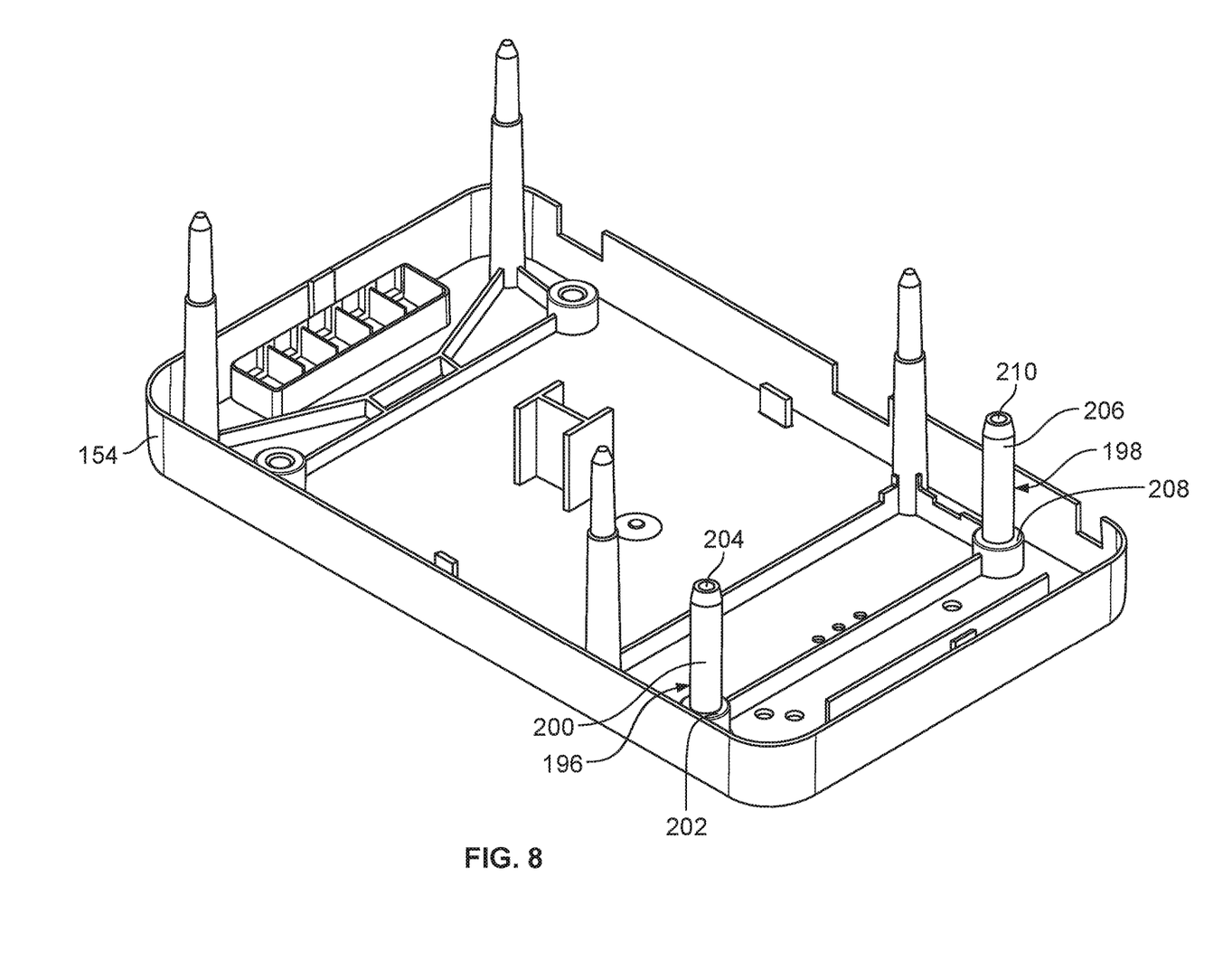
FIG. 8 is a perspective top view of a housing bottom.

FIG. 8 is a perspective top view of the housing bottom 154. The housing bottom 154 can include first and second bottom supporting structures 196 and 198 for supporting the flow control assembly 161. The first bottom supporting structure 196 can include a first bottom projection 200 and a first bottom stop 202. The first bottom projection 200 can define a first bottom hole 204 for receiving the threaded fastener 178. One of the vibration isolators 172 can abut the first bottom projection 200 and/or the first bottom stop 202 to dampen transmission of vibration between the flow control assembly 161 and the housing bottom 154. For example, an inner rim of the vibration isolator 172 can abut the first bottom projection 200 and another surface of the vibration isolator 172 abuts the printed circuit board 160 (shown in FIGS. 4-5), which can abut the first bottom stop 202. In other embodiments, the vibration isolator 172 can abut both the first bottom projection 200 and the first bottom stop 202 if the printed circuit board 160 is not in the way.

Similarly, the second bottom supporting structure 198 can include a second bottom projection 206 and a second bottom stop 208. The second bottom projection 206 can define a second bottom hole 210 for receiving and connecting to the threaded fastener 178. One of the vibration isolators 172 can abut the second bottom projection 206 and/or the second bottom stop 208 to dampen transmission of vibration between the flow control assembly 161 and the housing bottom 154.

Figure 9A:
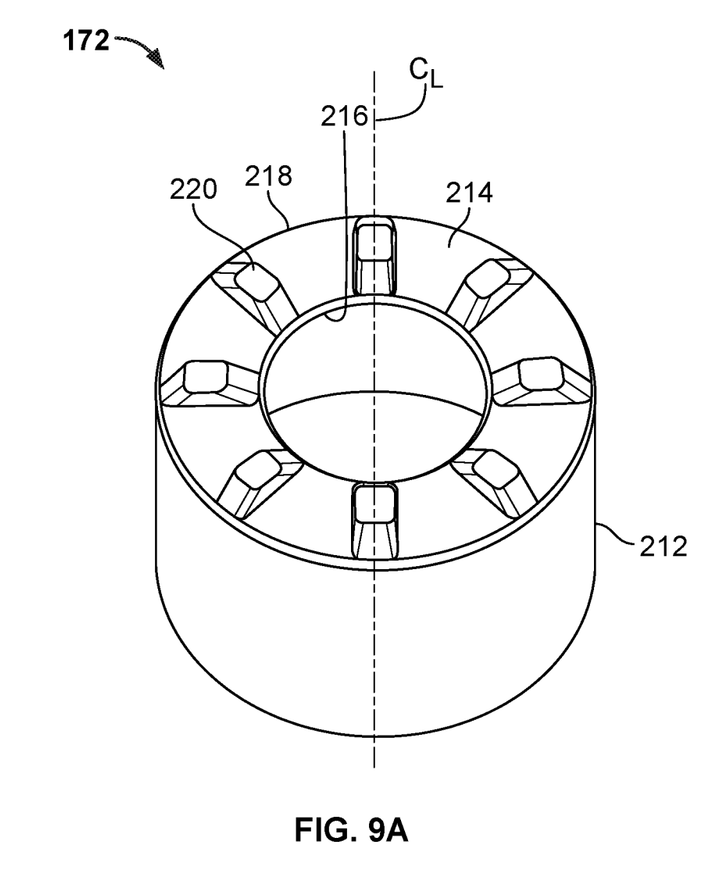
FIGS. 9A and 9B are perspective views of a vibration isolator.
Figure 9B:
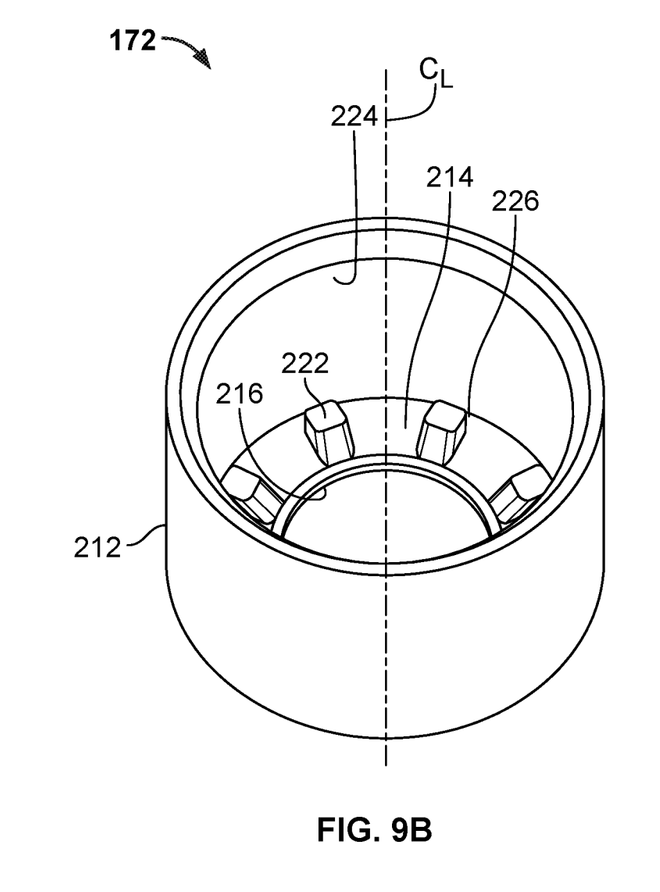

FIGS. 9A and 9B are perspective views of the vibration isolator 172. In some embodiments, the vibration isolator 172 can include a cylindrical portion 212 and an annular portion 214. The cylindrical portion 212 can extend substantially circumferentially about a centerline axis $C_L$. The annular portion 214 can extend substantially radially with respect to the centerline axis $C_L$ between an inner rim 216 of the annular portion 214 and an outer rim 218 of the annular portion 214. The inner rim 216 can define a hole and the outer rim 218 can be connected to an end of the cylindrical portion 212.

The vibration isolator 172 can be formed of an elastomer material suitable for dampening vibration. The cylindrical portion 212 can be integrally formed with the annular portion 214 as a single structure. In other embodiments, one or more portions of the vibration isolator 172 can be separately formed.

The vibration isolator 172 can include first and second projections 220 and 222. The annular portion 214 can include the first projections 220 extending from a first side of the annular portion 214 and can include the second projections 222 extending from a second side of the annular portion 214. Accordingly, the first and second projections 220 and 222 can be positioned on opposite sides, with the second projections 222 positioned substantially interior of the cylindrical portion 212 in a cavity defined by the vibration isolator 172.

In some embodiments, the first projections 220 can be shaped differently than the second projections 222. For example, the first projections 220 can extend substantially radially outward with respect to the centerline axis $C_L$ along a surface of the annular portion 214. The first projections 220 can be shaped as ribs that extend radially from the inner rim 216 to the outer rim 218. The first projections 220 can be positioned in an array, substantially equally spaced circumferentially about the centerline axis $C_L$.

The second projections 222 can be positioned opposite of the first projections 220. The second projections 222 can be positioned near an inner surface 224 of the cylindrical portion 212 but slightly spaced from the inner surface 224 by a gap 226. The second projections 222 can be positioned in an array, substantially equally spaced circumferentially about the centerline axis $C_L$.

The vibration isolator 172 can be sized and configured to connect to a mounting structure of the flow control assembly 161, such as the first and second posts 174 and 176 (shown in FIGS. 4 and 6). For example, one of the vibrations isolators 172 can be positioned on the first post 174 with the cylindrical portion 212 wrapped around a circumferential portion of the first post 174. The vibration isolator 172 can be positioned on an end of the first post 174 between the end of the first post 174 and a supporting structure of the housing 150, such as the first top supporting structure 180 of the housing top 152. The second projections 222 can extend substantially downward to abut the end of the first post 174 and the first projections 220 can extend substantially upward to abut the first top stop 186 of the first top supporting structure 180. This can allow the first and second projections 220 and 222 to dampen vibration of the flow control assembly 161 in an axial direction with respect to the centerline axis $C_L$.

The inner rim 216 of the annular portion 214 can abut the first top projection 184 of the first top supporting structure 180. The first top projection 184 can extend into a hole defined by the first post 174, with the vibration isolator 172 holding the first top projection 184 substantially centrally in that hole to reduce or prevent contact between the first post 174 and the first top projection 184. This can allow the annular portion 214 of the vibration isolator 172 to dampen vibration of the flow control assembly 161 in directions radial to the centerline axis $C_L$.

The vibration isolators 172 can also be positioned on a bottom end of the first post 174 and/or either or both ends of the second post 176. For example, the vibration isolator 172 can be positioned on a bottom end of the first post 174, with the circumferential portion 212 wrapped around a circumferential portion of the first post 174, the second projections 222 abutting the bottom end of the first post 174, and the first projections 220 abutting the printed circuit board 160 (shown in FIGS. 4-5). The inner rim 216 of the annular portion 214 can abut the first bottom projection 200 of the first bottom support structure 196 which can hold the first bottom projection 200 substantially centrally in a hole defined by the first post 174 to reduce or prevent contact between the first post 174 and the first bottom projection 200. This can allow the annular portion 214 of the vibration isolator 172 to dampen vibration of the flow control assembly 161 in directions radial to the centerline axis $C_L$.

By positioning the vibration isolators 172 between the first and second posts 174 and 176 of the flow control assembly 161 and each of the first and second top supporting structures 180 and 182 and the first and second bottom supporting structures 196 and 198, the flow control assembly 161 can be mounted in the housing 150 while reducing noise caused by vibration of the flow control assembly 161. In some cases, the configuration of the vibration isolators 172 can allow for relatively easy assembly, as the vibration isolators 172 can be slipped over the ends of the first and second top supporting structures 180 and 182 and the first and second bottom supporting structures 196 and 198 and hold the flow control assembly 161 in place without requiring additional fasteners other than the those already being used to secure the housing top 152 to the housing bottom 154.

A number of embodiments of the invention have been described. Nevertheless, it will be understood that various modifications may be made without departing from the spirit and scope of the invention. For example, in some cases the manifold 143 need not include the posts as illustrated, but rather, the flow control assembly can include other mounting structures suitable for the application. Moreover, one or more features present on one or more of the various embodiments can be considered optional, and need not necessarily be included in all embodiments. Accordingly, other embodiments are within the scope of the following claims.

What is claimed is:

1. An air bed system comprising:
a mattress comprising a first inflatable air chamber; and
an air controller fluidly connected to the first inflatable air chamber of the mattress for inflating and deflating the first inflatable air chamber, the air controller comprising:
an air pump;
a flow control assembly fluidly connected between the air pump and the first inflatable air chamber and including a first vertical post extending along an axis and having a first post top and a first post bottom opposite to the first post top along the axis;
first and second supporting structures, wherein the flow control assembly is supported between the first and second supporting structures; and
a plurality of vibration isolators including at least a first vibration isolator positioned between and supported by the first supporting structure and the first post top of the flow control assembly, and a second vibration isolator positioned between and supported by the second supporting structure and the first post bottom of the flow control assembly, wherein the first vibration isolator and the second vibration isolator are separate.

2. The air bed system of claim 1, wherein the air controller comprises a housing having a housing top and a housing bottom, wherein the first supporting structure is part of the housing top and the second supporting structure is part of the housing bottom, and wherein the vibration isolators prevent contact between the flow control assembly and the housing top and bottom so as to reduce transmission of vibration from the flow control assembly to the housing.

3. The air bed system of claim 1, wherein the flow control assembly comprises an air manifold and a plurality of valves connected to the air manifold.

4. The air bed system of claim 3, wherein the air manifold comprises the first vertical post having the first post top and the first post bottom and a second vertical post having a second post top and a second post bottom, wherein the first vibration isolator is positioned between the first post top and the first supporting structure, wherein the second vibration isolator is positioned between the first post bottom and the second supporting structure, wherein a third vibration isolator is positioned between the second post top and the first supporting structure, and wherein a fourth vibration isolator is positioned between the second post bottom and the second supporting structure.

5. The air bed system of claim 4, wherein the plurality of valves are rigidly mounted to the air manifold along a length of the air manifold between the first vertical post and the second vertical post.

6. The air bed system of claim 3, wherein the valves comprise solenoid valves rigidly mounted to the air manifold and wherein the air pump comprises a positive displacement pump spaced from the air manifold and connected to the air manifold via a tube.

7. The air bed system of claim 1, wherein the air controller comprises a housing having a housing top and a housing bottom, wherein the first supporting structure is part of the housing top and the second supporting structure is part of the housing bottom, wherein a threaded fastener extends through holes defined by the housing bottom, the first vibration isolator, the flow control assembly, the second vibration isolator, and the housing top to connect the housing top to the housing bottom and to hold the flow control assembly in place within the housing.

8. The air bed system of claim 1, wherein the vibration isolators each comprise a cylindrical portion extending substantially circumferentially about an axis and an annular portion extending substantially radially with respect to the axis and having an inner rim that defines a hole and an outer rim connected to an end of the cylindrical portion.

9. The air bed system of claim 8, wherein the annular portion comprises a first set of projections extending from a first side of the annular portion and a second set of projections extending from a second side of the annular portion, wherein the second side is positioned opposite the first side.

10. The air bed system of claim 9, wherein the first set of projections each extend radially from the inner rim to the outer rim and the second set of projections are shaped differently than the first set of projections.

11. The air bed system of claim 10, wherein the second set of projections are positioned proximate to and spaced from an inner surface of the cylindrical portion.

12. The air bed system of claim 10, wherein the flow control assembly comprises the first vertical post having the first post top and the first post bottom, wherein the first vibration isolator is positioned between the first post top and the first supporting structure with the cylindrical portion wrapped around a circumferential portion of the first post top with the second set of projections abutting an end of the first post top, the first set of projections abutting the first supporting structure, and the inner rim abutting the first supporting structure.

13. The air bed system of claim 12, wherein the second vibration isolator is positioned between the first post bottom and the second supporting structure with the cylindrical portion of the second vibration isolator wrapped around a circumferential portion of the first post bottom, with the second set of projections of the second supporting structure abutting an end of the first post bottom.

14. The air bed system of claim 9, wherein the flow control assembly comprises a post having a post end, wherein the first vibration isolator is positioned between the post end and the first supporting structure with the cylindrical portion wrapped around a circumferential portion of the post, with the second set of projections abutting the post end, with the first set of projections abutting the first supporting structure, and with the inner rim abutting the first supporting structure.

15. The air bed system of claim 8, wherein the flow control assembly comprises a post having a post end, wherein the first vibration isolator is positioned between the post end and the first supporting structure with the cylindrical portion wrapped around a circumferential portion of the post, with the annular portion abutting the post end and the first supporting structure.

16. The air bed system of claim 1, wherein the vibrations isolators comprise an elastomer.

17. An air controller comprising:
an air pump;
a flow control assembly having an air manifold fluidly connected to the air pump and a plurality of valves mounted to the air manifold, wherein the manifold includes a first vertical post that extends along an axis and has a first post top and a first post bottom opposite to the first post top along the axis;
a housing comprising a housing top having a first supporting structure and a housing bottom having a second supporting structure, wherein the flow control assembly is supported between the first and second supporting structures; and
a plurality of vibration isolators including at least a first vibration isolator positioned between and supported by the first supporting structure and the first post top of the flow control assembly, and a second vibration isolator positioned between and supported by the second supporting structure and the first post bottom of the flow control assembly, wherein the first vibration isolator and the second vibration isolator are separate.

18. The air controller of claim 17, wherein the vibration isolators each comprise a cylindrical portion extending substantially circumferentially about an axis and an annular portion extending substantially radially with respect to the axis and having an inner rim that defines a hole and an outer rim connected to an end of the cylindrical portion and wherein the annular portion comprises a first set of projections extending from a first side of the annular portion and a second set of projections extending from a second side of the annular portion, wherein the second side is positioned opposite the first side.

19. An air controller comprising:
an air pump;
a flow control assembly having an air manifold fluidly connected to the air pump and a plurality of valves mounted to the air manifold, wherein the manifold includes a first vertical post that extends along an axis and has a first post top and a first post bottom opposite to the first post top along the axis;
a housing including first and second supporting structures;
first means for mounting the flow control assembly in the housing and dampening transmission of vibration from the flow control assembly to the housing, the first means positioned between and supported by the first supporting structure and the first post top; and
second means for mounting the flow control assembly in the housing and dampening transmission of vibration from the flow control assembly to the housing, the second means positioned between and supported by the second supporting structure and the second post top, wherein the first means for mounting the flow control assembly and the second means for mounting the flow control assembly are separate.

* * * * *

UNITED STATES PATENT AND TRADEMARK OFFICE
CERTIFICATE OF CORRECTION

| | |
|---|---|
| PATENT NO. | : 10,888,173 B2 |
| APPLICATION NO. | : 15/337484 |
| DATED | : January 12, 2021 |
| INVENTOR(S) | : Shakal |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this
Sixteenth Day of August, 2022

Katherine Kelly Vidal
*Director of the United States Patent and Trademark Office*